United States Patent
Choi et al.

(10) Patent No.: US 8,514,804 B2
(45) Date of Patent: Aug. 20, 2013

(54) METHOD AND SYSTEM FOR MANAGING COMMUNICATION IN WIRELESS COMMUNICATION NETWORK

(75) Inventors: Jongsoo Choi, Surrey (GB); Satish Nanjunda Swamy Jamadagni, Byrasandra (IN); Sarvesha Anegundi Ganapathi, Byrasandra (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 188 days.

(21) Appl. No.: 13/201,086

(22) PCT Filed: Feb. 9, 2010

(86) PCT No.: PCT/KR2010/000774
§ 371 (c)(1),
(2), (4) Date: Aug. 11, 2011

(87) PCT Pub. No.: WO2010/093155
PCT Pub. Date: Aug. 19, 2010

(65) Prior Publication Data
US 2011/0310762 A1    Dec. 22, 2011

(30) Foreign Application Priority Data
Feb. 11, 2009  (IN) .............................. 328/CHE/2009

(51) Int. Cl.
*H04W 4/00* (2009.01)
(52) U.S. Cl.
USPC ........................................ 370/330; 370/337
(58) Field of Classification Search
CPC ............ H04L 27/2089; H04L 25/0226; H04L 25/0248; H04L 5/12; H04W 72/0446
See application file for complete search history.

(56) References Cited

U.S. PATENT DOCUMENTS

| | | | |
|---|---|---|---|
| 7,248,571 B1 | 7/2007 | Ilas et al. | |
| 2009/0201880 A1* | 8/2009 | Aghili et al. | 370/331 |
| 2009/0323588 A1* | 12/2009 | Aghili et al. | 370/328 |
| 2010/0067440 A1* | 3/2010 | Dick et al. | 370/328 |

OTHER PUBLICATIONS

China Mobile et al. 'WID: Multi-User Reusing-One-Slot (MUROS)' 3GPP TSG GERAN #36, GP-072033, Vancouver, Canada, Nov. 2007.
Huawei Technologies Co., Ltd. 'New strategy on SACCH for doenlink MUROS' 3GPP TSG GERAN #39, GP-081026, Florence, Italy, Aug. 2008.
Xiang Chen et al. 'GERAN Evolution: Multi-User Reusing One Slot to Improve Capacity' 2009 WRI International Conference on Communications and Mobile Computing, vol. 1,pp. 219-223, Jan. 6-8, 2009.

* cited by examiner

*Primary Examiner* — Jung Park
(74) *Attorney, Agent, or Firm* — Jefferson IP Law, LLP (57) ABSTRACT

A method and system for managing communication in a wireless communication network is provided. The method includes receiving a request from a first communication device to establish a first communication channel. A first time slot is assigned to the first communication device to establish the first communication channel. The method then receives a request from a second communication device to establish a second communication channel. Thereafter, the first time slot and a second time slot is simultaneously assigned to the second communication device for establishing the second communication channel. A first value of at least one of a plurality of predefined parameters at the first time slot is below a first threshold value. The first value of the at least one of the plurality of predefined parameters, is then monitored. Thereafter, the method relinquishes the second communication channel established using the second time slot based on the first value.

12 Claims, 5 Drawing Sheets

METHOD AND SYSTEM FOR MANAGING COMMUNICATION IN WIRELESS COMMUNICATION NETWORK

TECHNICAL FIELD

The present invention relates to managing communication in communication network. More particularly the present invention relates to managing communication links in a wireless communication network.

BACKGROUND ART

Communication devices such as mobile phones, personal digital assistance (PDA), laptops and computers are frequently used for communication. The communication devices can communicate with each other through communication network. The communication network can be a wire lined communication network or a wireless communication network. An example of wire lined communication network is public switched telephone network (PSTN).

In the wireless communication network, a communication range is divided into a plurality of regions called radio cells. Each radio cell has a base station. A base station is a radio transmitter and receiver used for transmitting and receiving voice and data signal to and from communication devices in a cell. Hence, a communication device can communicate with other communication devices in the wireless communication network through one or more base stations. Examples of wireless communication networks include but are not limited to Global system for mobile communications (GSM) network, and Code Division Multiple Access (CDMA) network.

Different communication network uses different communication technique for enabling communication between communication devices. The GSM communication network uses Time Division Multiple Access (TDMA) technology for providing communication to a plurality of communication devices. The Time division multiple access (TDMA) is a channel access method for radio networks. The method allows one or more users of the communication devices to share a same frequency channel by dividing signal into predefined number of time slots.

Hence, the TDMA technology allows a predefined number of users to communicate with other user of communication devices at the same time. Each of the predefined number of users is assigned a time slot for transmitting data in rapid succession, one after the other. However, as the number of users is fixed, there are various methods that are used to increase the number of users.

One method is applying Multiple Users Reusing One Single time slot (MUROS) concept. The MUROS concept enhances the cell capacity through pairing of two or more users on to a single timeslot. However, the quality of communication decreases and sudden degradation in the link quality is experienced, when the communication channel is established and the pairing of two users is performed using MUROS concept. Hence, the communication channel established can get relinquished automatically. In order to mitigate this problem, care should be taken that the link quality should not decrease suddenly. Further a proper allocation mechanism is required to assign multiple users to a single timeslot.

DISCLOSURE OF INVENTION

Technical Problem

Hence there exists a need to manage communication links when the wireless communication network uses Multiple Users Reusing One Single time slot (MUROS) concept for establishing communication channel.

Solution to Problem

In an embodiment, a method for managing communication in a wireless communication network is provided. In an embodiment, the method is performed at a base transceiver station. The method includes receiving a request from a first communication device to establish a first communication channel with at least one communication device; assigning a first time slot to the first communication device to establish the first communication channel; receiving a request from a second communication device to establish a second communication channel with at least one communication device; assigning the first time slot and a second time slot simultaneously to the second communication device for establishing the second communication channel; establishing the second communication channel using the first time slot and the second time slot, wherein a first value of at least one of a plurality of predefined parameters at the first time slot is below a first threshold value; monitoring the first value of the at least one of the plurality of predefined parameters, wherein the first value of at least one of the plurality of predefined parameters changes while the second communication channel is established; and relinquishing the second communication channel established using the second time slot based on the first value of at least one of the plurality of predefined parameter in the first timeslot.

In another embodiment, a method for managing communication in a wireless communication network is provided. The method includes sending a request from a second communication device to a base transceiver station for establishing a second communication channel with at least one communication device; assigning a first time slot and a second time slot to the second communication device for establishing the second communication channel, wherein the first time slot is associated with a first communication device for establishing a first communication channel; establishing the second communication channel between the second communication device and the at least one communication device using the first time slot and the second time slot, wherein a first value of the at least one of the plurality of predefined parameters at the first time slot is below a first threshold value; changing the first value of the at least one of the plurality of predefined parameters at the first time slot, wherein the first value of the one of the plurality of predefined parameters changes continuously while the second communication channel is established; monitoring the first value of the at least one of the plurality of predefined parameters, wherein the monitoring is executed by at least one of the second communication device and the base transceiver station; and relinquishing the second communication channel using the second time slot based on the first value of the at least one of the plurality of predefined parameters.

In yet another embodiment, a communication device is provided. The communication device includes a transceiver and processor. The transceiver: sends a request to establish a communication channel with at least one communication device; and receives an indication to associate a first time slot and a second time slot simultaneously for establishing the communication channel. The processor is configured to enable: establishment of the communication channel using the first time slot and the second time slot, wherein a first value of at least one of a plurality of predefined parameters at the first time slot is below a first threshold predefined value; change of the first value of the at least one of the plurality of predefined parameters at the first time slot; and relinquishment of the communication channel established using the second time slot based on the first value of the at least one of a plurality of predefined parameters.

In still another embodiment, base transceiver station is provided. The base station includes a transceiver and a processor. The transceiver to receive a request from: a first communication device to establish a first communication channel with at least one communication device; and a second communication device to establish a second communication channel with at least one communication device. The processor is configured to enable: assignment of a first time slot to the first communication device to establish the first communication channel; assignment of the first time slot and a second time slot to the second communication device for establishing the second communication channel; establishment of the second communication channel using the second time slot and the first time slot, wherein a first value of at least one of a plurality of predefined parameters at the first time slot is below a first threshold value; monitoring of the first value of the at least one of the plurality of predefined parameters at the first time slot; and relinquishment of the second communication channel established using the second time slot based on the first value of the at least one of the plurality of predefined parameter.

The features and advantages of the present invention will become more apparent from the ensuing detailed description of the invention taken in conjunction with the accompanying drawings.

Advantageous Effects of Invention

The present invention provides a method for managing communication in a wireless communication network. The method allows a plurality of communication devices to establish communication channel using a single time slot without degrading link quality in the communication channel. The method enhances a cell capacity through pairing of plurality of users on to one time slot.

BRIEF DESCRIPTION OF DRAWINGS

The accompanying figure, similar reference numerals may refer to identical or functionally similar elements. These reference numerals are used in the detailed description to illustrate various embodiments and to explain various aspects and advantages of the present disclosure.

Persons skilled in the art will appreciate that elements in the figure is illustrated for simplicity and clarity and may have not been drawn to scale. For example, the dimensions of some of the elements in the figure may be exaggerated relative to other elements to help to improve understanding of various embodiments of the present disclosure.

MODE FOR THE INVENTION

The terms used to describe various embodiments are exemplary. It should be understood that these are provided to merely aid the understanding of the description, and that their use and definitions in no way limit the scope of the invention. Terms first, second, and the like are used to differentiate between objects having the same terminology and are no where intended to represent a chronological order, as and where stated otherwise. A set is defined as a non-empty set including at least one element.

Figure 1:
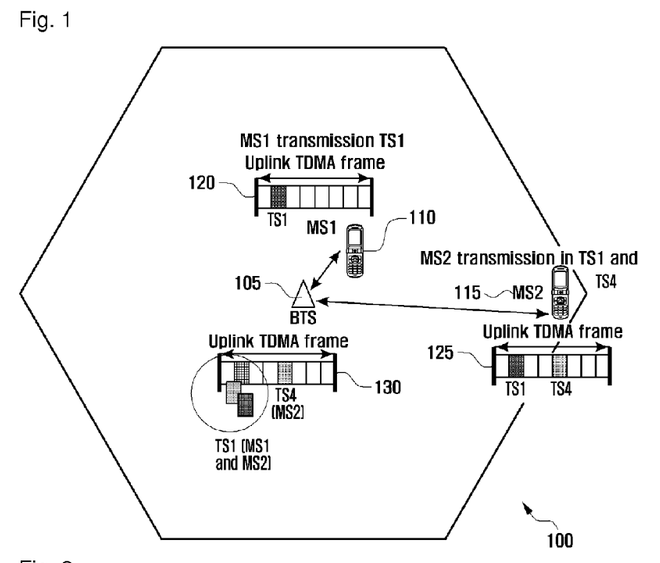
FIG. 1 illustrates an exemplary environment, where various embodiments of the present invention can be practiced.

FIG. 1 illustrates an exemplary environment 100, where various embodiments of the present invention can be practiced. The environment 100 includes a Base Transceiver Station (BTS) and a plurality of communication devices. The environment 100 includes a BTS 105, a communication device 110, and a communication device 115. However, only one BTS and two communication devices are shown in the environment 100, it will be apparent to the person ordinary skilled in the art that the environment 100 includes more number of BTS and more number of communication devices.

The examples of the communication devices 110 and 115 include, but are not limited to, Mobile phones, Personal Digital Assistance (PDA), and Computers. For the sake of clarity and for the purpose of this description, the communication device 110 and 115 will also be referred as mobile device 110 and mobile device 115. However, it no where limits the scope of the invention to mobile device and hence the person ordinary skilled in the art can use any other communication device.

The plurality of communication devices are capable of communicating with each other through a communication network. In an embodiment, the communication devices 110 and 115 are capable of communicating with each other through a wireless communication network. Examples of wireless communication network include but are not limited to, Global System for Mobile communications (GSM), General Packet Radio Service (GPRS) and Code division multiple access (CDMA). In an embodiment, the communication devices 110 and 115 are capable of communicating with each other through GSM communication technology. The GSM communication uses a TDMA technique for enabling communication between communication devices.

Hence, the communication device 110 for establishing communication channel and for sending data, requests the BTS 105 for assigning a time slot. Thereafter, the BTS 105 assigns a time slot to the mobile device 110 for sending the data. For example, the BTS 105 assigns a first time slot, for example time slot one (TS1), in an uplink frame 120 to the mobile device 110 for establishing a first communication channel. Hence, in each uplink frame 120 the data from the mobile device 110 will be sent in the TS1. Therefore, the BTS 105 assigns a time slot in the uplink frame to the mobile device for establishing the communication channel.

In an embodiment, a single time slot is assigned to more than one communication device for establishing communication channel. This is performed when the Multiple Users Reusing One Single time slot (MUROS) concept is implemented for establishing communication channel. In an embodiment, the environment 100 also implements MUROS concept for enabling communication.

Hence, the BTS 105 will assign the first time slot (TS1) to the mobile device 115, when the mobile device 115 requests for establishing a second communication channel. Therefore, the mobile device 110 and the mobile device 115 are assigned the same time slot, for example time slot one (TS1), for establishing the first communication channel and the second communication channel. However, there may be a case that when the first communication channel and the second communication channel are established the communication channels may see a sudden degradation. To avoid the degradation, a soft pairing is performed.

In soft pairing, the BTS 105 will simultaneously assign a second time slot, for example time slot four (TS4) and the first time slot, for example time slot one (TS1), to the mobile device 115. In an embodiment, the TS 1 is already assigned to at least one communication device in the environment and the time slot four is not assigned to any of the communication device. For example, in the uplink frame 125, the time slot one (TS1) and time slot four (TS4) is assigned to the mobile device 115 for establishing the second communication channel.

Further in soft pairing, initially a first value of at least one of a plurality of predefined parameters is maintained below a first threshold value, when the second communication channel is established using the TS1. However, the second communication channel established using the TS4 is established using standard values of at least one of a plurality of predefined parameters. In an embodiment, the plurality of predefined parameters include, but are not limited to, a bit error rate at the first time slot, Quality of Experience (QoE) at the first time slot, Signal quality at the first time slot, and signal power at the first time slot.

Hence, the BTS 105 will establish the first communication channel associated with the mobile device 110 using the time slot one (TS1). Further, the BTS 105 will establish second communication associated with the mobile device 115 using the time slot one (TS1) and the time slot four (TS4). This is also shown in uplink frame 130 in the environment 100. In the environment 100, though the second communication channel is established using TS1 and TS4 but the data associated with the second communication channel is initially sent using time slot four. This is because the first value of at least one of the plurality of predefined parameter associated with the first time slot is below a first threshold value.

Thereafter, the first value of at least one of the plurality of predefined parameter is changed and monitored. Thereafter, the second communication channel established using time slot four (TS4) is relinquished when the first value of the at least one of the plurality of predefined parameter is above a first threshold value. Therefore, the first communication channel and the second communication channel are established using the time slot one (TS1).

Figure 2:
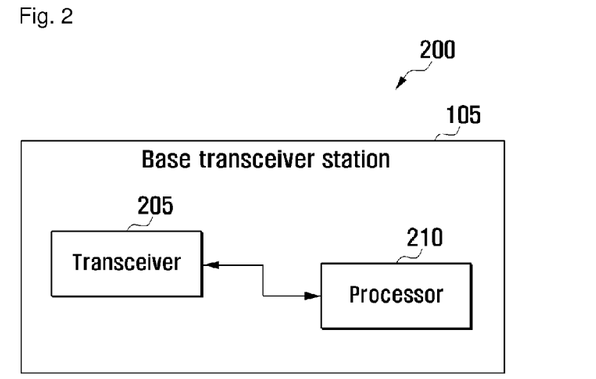
FIG. 2 illustrates a base transceiver station, in accordance with one embodiment of the present invention.

FIG. 2 illustrates a base transceiver station, in accordance with one embodiment of the present invention. To explain the communication device, references will be made to FIG. 1. However, it will be apparent to a person ordinarily skilled in the art that the present embodiment can be explained with the help of any other suitable embodiment of the present invention. The Base Transceiver Station (BTS) 105 includes a transceiver 205 and a processor 210.

The transceiver 205 is capable of receiving a request from plurality of communication device for establishing communication channel. In an embodiment, the transceiver 205 receives a request from a first communication device, for example the communication device 110, to establish a first communication channel with at least one communication device. In an embodiment, the transceiver 205 also receives a request from a second communication device, for example the communication device 115, to establish a second communication channel with at least one communication device.

The requests received by the transceiver 205 are then processed by the processor 210. The processor 210 then enables assignment of time slot to the communication devices for establishing communication channel. Hence, the processor 210 then enables assignment of a first time slot to the first communication device 110 to establish the first communication channel. Hence the first time slot, for example time slot one (TS1) is then assigned to the communication device 110 for establishing communication channel.

In an embodiment, when the MUROS concept is applied, then the processor 210 also enables assignment of the first time slot and a second time slot to the second communication device for establishing the second communication channel. In an embodiment, the first time slot is already used by the first communication device 110. The processor 210 then enables the BTS 105 to establish the second communication channel using the second time slot and the first time slot. In an embodiment, a first value of at least one of a plurality of predefined parameters at the first time slot is below a first threshold value.

The processor 210 also enables monitoring of the first value of the at least one of the plurality of predefined parameters at the first time slot. In an embodiment, the processor 210 continuously monitors the first value. In an embodiment, the processor 210 enables relinquishment of the second communication channel that is established using the first time slot. In an embodiment, the processor 210 relinquishes the second channel communication based on the first value of the at least one of the plurality of predefined parameter.

Figure 3:
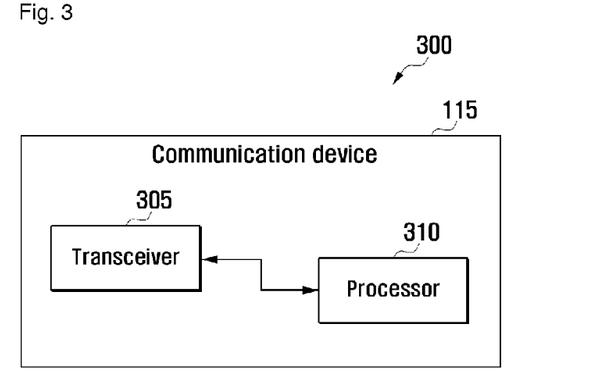
FIG. 3 illustrates a communication device, in accordance with one embodiment of the present invention.

FIG. 3 illustrates a communication device, in accordance with one embodiment of the present invention. To explain the communication device, references will be made to FIG. 1. However, it will be apparent to a person ordinarily skilled in the art that the present embodiment can be explained with the help of any other suitable embodiment of the present invention. The communication device 115 includes a transceiver 305 and a processor 310.

The transceiver 305 sends a request from the communication device 115 to establish a communication channel with at least one communication device. After sending the request, the transceiver 305 receives an indication to associate a first time slot and a second time slot simultaneously for establishing the communication channel.

The processor 310 in the communication device 115 is configured to enable establishment of the communication channel using the first time slot and the second time slot. In an embodiment, a first value of at least one of a plurality of predefined parameters at the first time slot is below a first threshold value. The processor 310 then changes the first value of the at least one of the plurality of predefined parameters at the first time slot.

Further, the processor 310 enables relinquishment of the communication channel established using the second time slot based on the first value of the at least one of a plurality of predefined parameters.

Figure 4:
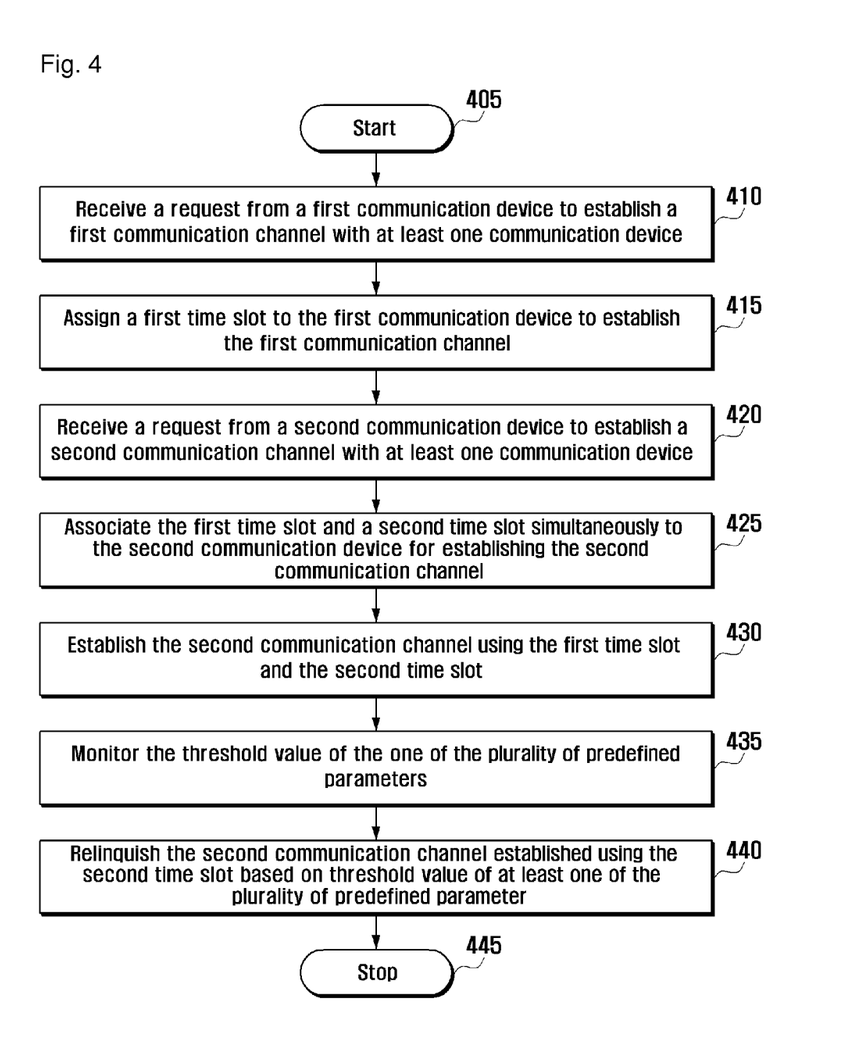
FIG. 4 illustrates a flow chart depicting a method for managing communication in a wireless communication network, in accordance with one embodiment of the present invention.

FIG. 4 illustrates a flow chart depicting a method for managing communication in a wireless communication network, in accordance with one embodiment of the present invention. To explain the method 400, references will be made to FIG. 1. However, it will be apparent to a person ordinarily skilled in the art that the present embodiment can be explained with the help of any other suitable embodiment of the present invention. The method 400 can also include more or fewer number of steps as depicted in FIG. 4. Further, the order of the steps may also vary.

At step 405, the method 400 is initiated. In an embodiment, the method is implemented at the base transceiver station. At step 410, the method receives a request from a first communication device, for example the mobile device 110, to establish a first communication channel with at least one communication device. At step 415, a first time slot (TS1) is assigned to the first communication device to establish the first communication channel. Thereafter, at step 420 a request from a second communication device, for example the mobile device 115, is received to establish a second communication channel with at least one communication device.

The method at step 425 assigns the first time slot (TS1) and a second time slot (TS4) simultaneously to the second communication device for establishing the second communication channel. At step 430, the second communication channel is established using the first time slot (TS1) and the second time slot (TS4). In an embodiment, a first value of at least one of a plurality of predefined parameters at the first time slot (TS1) is below a first threshold value. In an embodiment, the plurality of predefined parameters is a bit error rate at the first time slot or a Quality of Experience (QoE) at the first time slot or a signal quality at the first time slot, or a signal power at the first time slot.

Further, the method at step 435 monitors the first value of the at least one of the plurality of predefined parameters. In an embodiment, the first value of the at least one of the plurality of predefined parameters changes while the second communication channel is established. In another embodiment, the first value is compared with the first threshold value while the second communication channel is established.

In an embodiment, a plurality of Slow Associated Control Channels (SACCH) is established. The SACCH is established based on plurality of communication channel established and a plurality of time slot associated with each of the plurality of communication channel.

Hence a first SACCH associated with the first communication channel and a first time slot. Similarly, a second SACCH associated with the second communication channel and first time slot. Further, a third SACCH associated with the second communication channel and the second time slot.

In an embodiment, first values of the at least one of the plurality of predefined parameters associated with the plurality of communication channels and the plurality of time slots is monitored in the plurality of SACCH. In an embodiment, first values of the at least one of the predefined parameters associated with a SACCH is monitored at different SACCH. Hence, the first value of the at least one of the predefined parameters associated with second SACCH can be monitored at the third SACCH. Similarly, the first value of the at least one of the predefined parameters associated with the third SACCH is monitored at the second SACCH.

In an embodiment, a notification message is sent to the second communication device while the second communication channel is established. In an embodiment, the notifications message is information associated with a plurality of threshold values associated with the plurality of predefined parameters. In another embodiment, the notification message is information associated with relinquishing the second communication using the second time slot and maintaining the second communication channel using the first time slot.

At step 440, the second communication channel established using the second time slot (TS4) is relinquished based on the first value of the at least one of the plurality of predefined parameter. Thereafter, the method is terminated at step 445.

Figure 5:
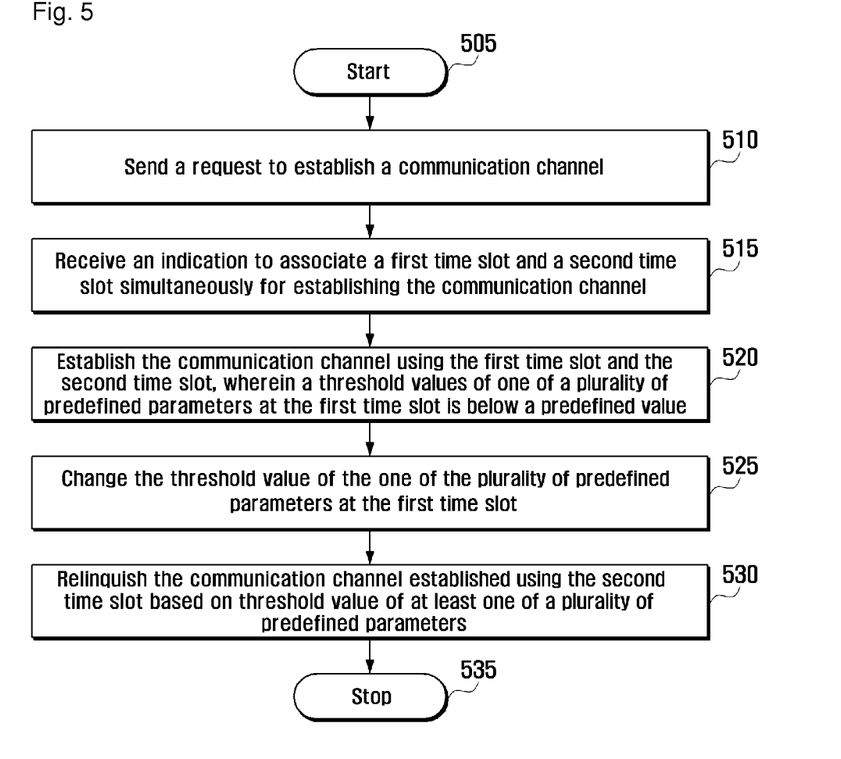
FIG. 5 illustrates a flow chart depicting a method for managing communication in a wireless communication network, in accordance with another embodiment of the present invention.

FIG. 5 illustrates a flow chart depicting a method for managing communication in a wireless communication network, in accordance with another embodiment of the present invention. To explain the method 500, references will be made to FIG. 1. However, it will be apparent to a person ordinarily skilled in the art that the present embodiment can be explained with the help of any other suitable embodiment of the present invention. The method 500 can also include more or fewer number of steps as depicted in FIG. 5. Further, the order of the steps may also vary. In an embodiment, the method is performed by the communication device.

At step 505 the method is initiated. At step 510, a request is sent to a base transceiver station, for example the BTS 105, for establishing a communication channel. At step 515, an indication is received by the mobile device 115 to associate a first time slot (TS1) and a second time slot (TS4) simultaneously for establishing the communication channel. In an embodiment, the first time slot is associated with a plurality of communication device for establishing a first communication channel. For example, the first time slot is associated with a first communication device, for example the mobile device 110, for establishing a first communication channel.

At step 520, the communication channel is established using the first time slot (TS1) and second time slot (TS4). In an embodiment, a first value of at least one of a plurality of predefined parameters at the first time slot is maintained below a first threshold value. In an embodiment, the plurality of predefined parameters is a bit error rate at the first time slot or a Quality of Experience (QoE) at the first time slot or a signal quality at the first time slot, or a signal power at the first time slot. Thereafter at step 525, the first value of the at least one of the plurality of predefined parameters at the first time slot is changed.

In an embodiment, the first value of the at least one of the plurality of predefined parameters changes continuously while the communication channel is established. In an embodiment, the first value is continuously monitored. Thereafter at step 530, the communication channel established using the second time slot (TS4) is relinquished based on the first value of the at least one of a plurality of predefined parameters. At step 535 the method is terminated.

Figure 6:
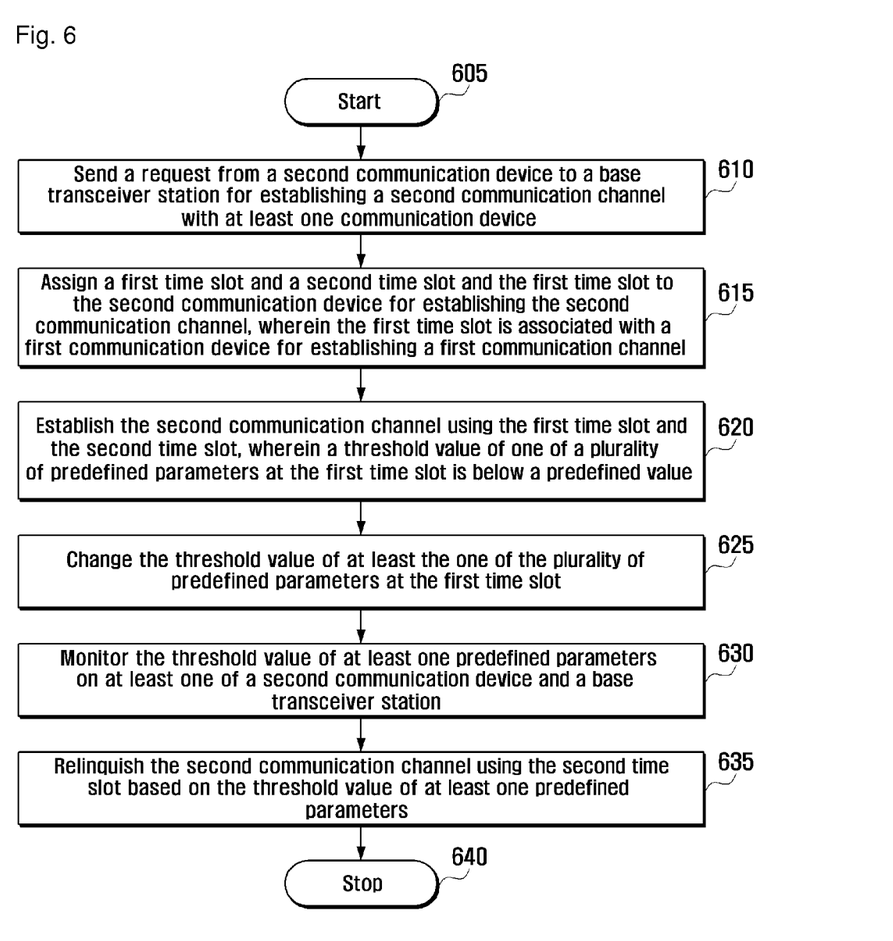
FIG. 6 illustrates a flow chart depicting a method for managing communication in a wireless communication network, in accordance with yet another embodiment of the present invention.

FIG. 6 illustrates a flow chart depicting a method for managing communication in a wireless communication network, in accordance with yet another embodiment of the present invention. To explain the method 600, references will be made to FIG. 1. However, it will be apparent to a person ordinarily skilled in the art that the present embodiment can be explained with the help of any other suitable embodiment of the present invention. The method 600 can also include more or fewer number of steps as depicted in FIG. 6. Further, the order of the steps may also vary.

At step 605 the method is initiated. At step 610 a request from a second communication device is sent to a base transceiver station for establishing a second communication channel with at least one communication device. For example, the mobile device 115 sends a request to BTS 105 for establishing the second communication channel.

At step 615, the BTS 105 assigns a first time slot (TS1) and a second time slot (TS4) to the second communication device for establishing the second communication channel. In an embodiment, the first time slot (TS 1) is associated with a first communication device, for example the mobile device 110, for establishing a first communication channel.

Thereafter at step 620, the second communication channel is established between the second communication device and the at least one communication device using the first time slot (TS1) and the second time slot (TS4). In an embodiment, a first value of the at least one of the plurality of predefined parameters at the first time slot is below a first threshold value. In an embodiment, the plurality of predefined parameters is a bit error rate at the first time slot or a Quality of Experience (QoE) at the first time slot or a signal quality at the first time slot, or a signal power at the first time slot. The method at step 625 changes the first value of the at least one of the plurality of predefined parameters at the first time slot. In an embodiment, the first value of the one of the plurality of predefined parameters changes continuously while the second communication channel is established.

At step 630 the first value of the at least one of the plurality of predefined parameters is monitored continuously. In an embodiment, the first value is monitored by the second communication device, for example the mobile device 115. In another embodiment, the first value is monitored by the base transceiver station, for example the BTS 105.

At step 635, the second communication channel using the second time slot (TS4) is relinquished based on the first value of the at least one of the plurality of predefined parameters. For example, the second communication channel using the second time slot is relinquished when the first value is above the first threshold value. At step 640, the method is terminated.

Figure 7:
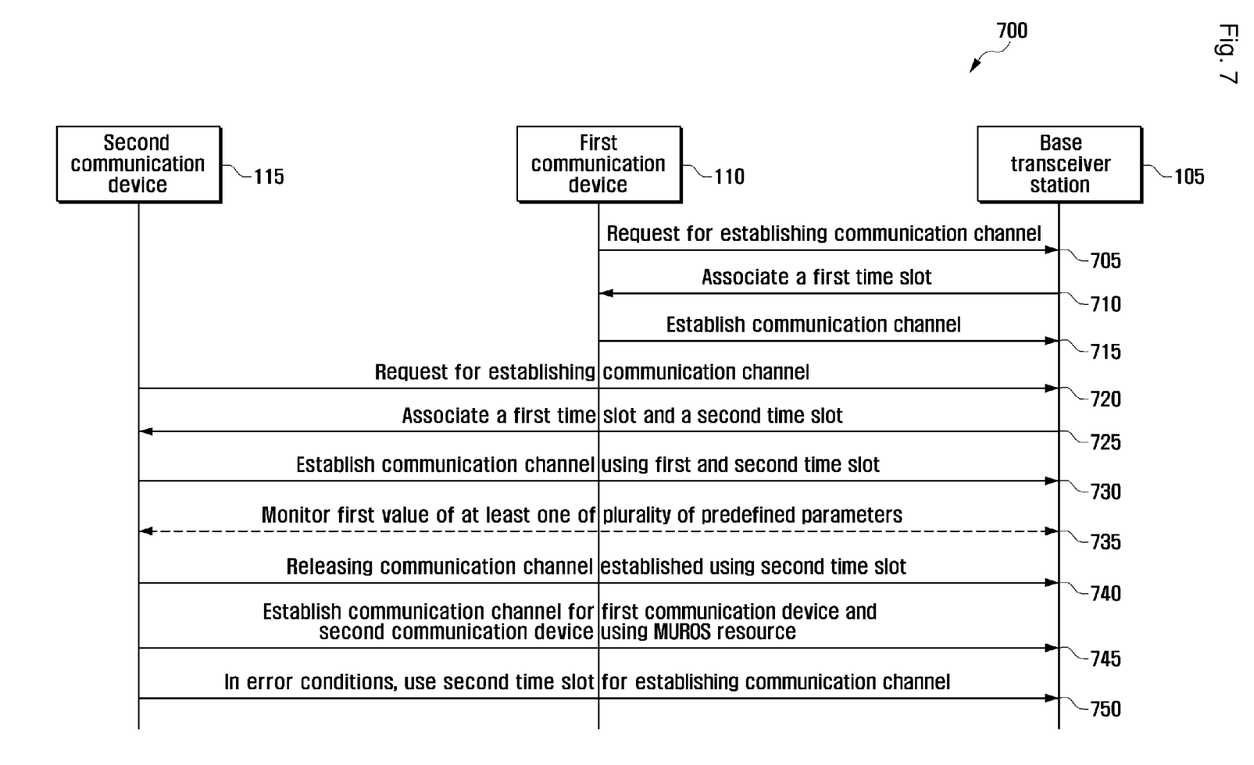
FIG. 7 illustrates a message flow diagram depicting a method for managing communication in a wireless communication network, in accordance with one embodiment of the present invention.

FIG. 7 illustrates a message flow diagram depicting a method for managing communication in a wireless communication network, in accordance with one embodiment of the present invention. To explain the method 700, references will be made to FIG. 1. However, it will be apparent to a person ordinarily skilled in the art that the present embodiment can be explained with the help of any other suitable embodiment of the present invention. The method 700 can also include more or fewer number of steps as depicted in FIG. 7. Further, the order of the steps may also vary.

At step 705, a first communication device, for example the mobile device 110, requests the Base Transceiver Station (BTS) 105 to enable establishment of a first communication channel with at least one communication device. At step 710, the BTS 105 associate a first time slot, for example time slot one (TS1), for establishing first communication channel.

At step 715, the first communication device 110 establishes the first communication channel using the first time slot (TS1). At step 720, the second communication device, for example the communication device 115, requests the BTS 105 to enable an establishment of a second communication channel with at least one communication device. In an embodiment, the second communication channel is established using a MUROS concept. At step 725, the BTS 105 associate a first time slot, for example TS1, and a second time slot, for example the time slot four (TS4), for establishing the second communication channel.

In an embodiment, a soft pairing is performed while establishing the second communication channel. In soft pairing, a first value of at least one of the plurality of predefined parameters at the first time slot (TS1) is maintained below a first threshold value, while establishing the second communication channel using the first time slot (TS1).

In an embodiment, the plurality of predefined parameters is a bit error rate at the first time slot or a Quality of Experience (QoE) at the first time slot or a signal quality at the first time slot, or a signal power at the first time slot. In another embodiment, a first value of at least one of the plurality of predefined parameters at the second time slot (TS4) is above the first threshold value, while establishing the second communication channel using the second time slot (TS4).

In an embodiment, first value of at least one of a plurality of predefined parameters is a signal power level. Hence a signal power is maintained below a first threshold value while establishing the second communication channel using the first time slot 'TS1'. In an embodiment, the first threshold value associated with signal power level in a communication channel is Nine decibels. Hence, while establishing second communication channel using the first time slot the signal power level is maintained below nine decibels.

Further, a signal power level is above a first threshold value, for example above nine decibels, when the second communication channel is established using the second time slot (TS4) and the first communication channel is established using first time slot (TS1). Hence, the interference is reduced at the time slot one (TS1) and the first communication channel and the second communication channel is established successfully.

In an embodiment, the first value of the at least one of the plurality of predefined parameters is changed. For example, the signal power in the second communication channel using the first time slot is gradually increased. At step 735, the first value of at least one of plurality of predefined parameters is continuously monitored. In an embodiment, the second communication device 115 monitors the first value. In another embodiment, the BTS 105 monitors the first value.

At step 740, the second communication channel established using the second time slot is released when the first value is above a first threshold value. For example, the second communication channel using the second time slot is released when the signal power level in the second communication channel using the first time slot is above nine decibels.

At step 745, the first communication channel and the second communication channel is established using the first time slot (TS1). Hence the communication channel is established using MUSROS concept. In error condition the second communication channel using the first time slot is released. Further, the second communication channel is established using the second time slot (TS4). At step 750, the method checks for error conditions. Thereafter, the second communication channel using the first time slot is released and the second communication channel using the second time slot (TS4) is maintained.

Various embodiments of the present invention described above provide the following advantages. The present invention provides a method for managing communication in a wireless communication network. The method allows a plurality of communication devices to establish communication channel using a single time slot without degrading link quality in the communication channel. The method enhances a cell capacity through pairing of plurality of users on to one time slot.

The method also provides a soft approach in pairing multiple communication devices on to single time slot. The method continuously monitors quality of established communication channels. Further, the method relinquishes the established communication channel when an error is identified. Therefore, the method increases efficiency of the overall communication system.

The method also does not allow a plurality of communication devices to use a same time slot till the BER is not of acceptable level. This increases overall voice quality of the communication channel and reduces noise interference. Further the method decreases call drop chances immediately after pairing and provides a means for fallback if the link quality of the paired link degrades.

While the embodiments of the present invention have been illustrated and described, it will be clear that the present invention and its advantages are not limited to these embodiments only. Numerous modifications, changes, variations, substitutions and equivalents will be apparent to those skilled in the art without departing from the spirit and scope of the present invention as described in the claims.

The invention claimed is:

1. A method for managing communication in a wireless communication network, the method at a base transceiver station comprising:

receiving a request from a first communication device to establish a first communication channel with at least one communication device;

assigning a first time slot to the first communication device to establish the first communication channel;

receiving a request from a second communication device to establish a second communication channel with at least one communication device;

assigning the first time slot and a second time slot simultaneously to the second communication device for establishing the second communication channel;

establishing the second communication channel using the first time slot and the second time slot, wherein a first value of at least one of a plurality of predefined parameters at the first time slot is below a first threshold value;

monitoring the first value of the at least one of the plurality of predefined parameters, wherein the first value of the at least one of the plurality of predefined parameters changes while the second communication channel is established; and relinquishing the second communication channel established using the second time slot based on the first value of the at least one of the plurality of predefined parameters.

2. The method of claim 1, wherein monitoring the first value of the at least one of the plurality of predefined parameters comprises at least one of changing the first value while the second communication channel is established and comparing the first value of at least one of the plurality of predefined parameters continuously against the first threshold value, wherein the plurality of predefined parameters are associated with at least one of a bit error rate at the first time slot, Quality of Experience (QoE) at the first time slot, signal quality at the first time slot, and signal power at the first time slot.

3. The method of claim 2 further comprising sending notification messages to the second communication device while the second communication channel is established, wherein the notifications messages includes at least one of:

information associated with a plurality of values associated with the plurality of predefined parameters, and information associated with relinquishing the second communication channel using the second time slot and maintaining the second communication channel using the first time slot.

4. The method of claim 1 further comprising establishing a plurality of Slow Associated Control Channels (SACCH) based on a plurality of communication channel established and a plurality of time slots associated with each of the plurality of communication channel, wherein first values of the at least one of the plurality of predefined parameters associated with the plurality of communication channels and the plurality of time slots is monitored in the plurality of SACCH.

5. The method of claim 4, wherein establishing a plurality of Slow Associated Control Channels (SACCH) comprises setting up at least one of:

a first SACCH associated with the first communication channel and the first time slot, a second SACCH associated with the second communication channel and the first time slot, and a third SACCH associated with the second communication channel and the second time slot.

6. The method of claim 5 further comprising monitoring the first value of the at least one of the plurality of predefined parameters associated with second SACCH at the third SACCH.

7. A method for managing communication in a wireless communication network, the method at communication device comprising:

sending a request to establish a communication channel;

receiving an indication to associate a first time slot and a second time slot simultaneously for establishing the communication channel, wherein the first time slot is associated with a first communication device for establishing a first communication channel;

establishing the communication channel using the first time slot and the second time slot, wherein a first value of at least one of a plurality of predefined parameters at the first time slot is below a first threshold value;

changing the first value of the at least one of the plurality of predefined parameters at the first time slot, wherein the first value of the at least one of the plurality of predefined parameters changes continuously while the second communication channel is established; and relinquishing the communication channel established using the second time slot based on the first value of the at least one of the plurality of predefined parameters.

8. The method of claim 7 further comprising monitoring the first value of the at least one of the plurality of predefined parameters continuously, wherein the plurality of predefined parameters are associated with at least one of a bit error rate at the first time slot, Quality of Experience (QoE) at the first time slot, Signal quality at the first time slot, and signal power at the first time slot.

9. A method for managing communication in a wireless communication network, the method comprising:

sending a request from a second communication device to a base transceiver station for establishing a second communication channel with at least one communication device;

assigning a first time slot and a second time slot to the second communication device for establishing the second communication channel, wherein the first time slot is associated with a first communication device for establishing a first communication channel;

establishing the second communication channel between the second communication device and the at least one communication device using the first time slot and the second time slot, wherein a first value of the at least one of a plurality of predefined parameters at the first time slot is below a first threshold value;

changing the first value of the at least one of the plurality of predefined parameters at the first time slot, wherein the first value of the one of the plurality of predefined parameters changes continuously while the second communication channel is established;

monitoring the first value of the at least one of the plurality of predefined parameters, wherein the monitoring is executed by at least one of the second communication device and the base transceiver station; and relinquishing the second communication channel using the second time slot based on the first value of the at least one of the plurality of predefined parameters.

10. The method of claim 9 further comprising allowing the plurality of communication devices to use the first time slot for establishing communication channel, wherein the communication channel is established based on Multiple Users Reusing One Single time Slot (MUROS) communication technology.

11. A communication device comprising:
a transceiver to:
send a request to establish a communication channel with at least one communication device; and
receive an indication to associate a first time slot and a second time slot simultaneously for establishing the communication channel; and
a processor configure to enable:
establishment of the communication channel using the first time slot and the second time slot, wherein a first value of at least one of a plurality of predefined parameters at the first time slot is below a first threshold value;
change of the first value of the at least one of the plurality of predefined parameters at the first time slot; and
relinquishment of the communication channel established using the second time slot based on the first value of the at least one of the plurality of predefined parameters.

12. A base transceiver station comprising:
a transceiver to receive a request from:
a first communication device to establish a first communication channel with at least one communication device; and
a second communication device to establish a second communication channel with at least one communication device; and
a processor configured to enable:
assignment of a first time slot to the first communication device to establish the first communication channel;
assignment of the first time slot and a second time slot to the second communication device for establishing the second communication channel;
establishment of the second communication channel using the second time slot and the first time slot, wherein a first value of at least one of a plurality of predefined parameters at the first time slot is below a first threshold value;
monitoring of the first value of the at least one of the plurality of predefined parameters at the first time slot; and
relinquishment of the second communication channel established using the second time slot based on the first value of the at least one of the plurality of predefined parameters.

* * * * *